US008817956B2

(12) United States Patent
Yang et al.

(10) Patent No.: US 8,817,956 B2
(45) Date of Patent: Aug. 26, 2014

(54) METHOD AND SYSTEM FOR SERVICE ACCESS OF USER IN ACCESS GATEWAY CONTROL FUNCTION ENTITY

(75) Inventors: Qiang Yang, Shenzhen (CN); Chen Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 267 days.

(21) Appl. No.: 13/258,398

(22) PCT Filed: Jul. 15, 2010

(86) PCT No.: PCT/CN2010/075196
§ 371 (c)(1),
(2), (4) Date: Mar. 6, 2012

(87) PCT Pub. No.: WO2011/029348
PCT Pub. Date: Mar. 17, 2011

(65) Prior Publication Data
US 2012/0195414 A1    Aug. 2, 2012

(30) Foreign Application Priority Data
Sep. 9, 2009  (CN) .......................... 2009 1 0092862

(51) Int. Cl.
*H04M 11/00*    (2006.01)
(52) U.S. Cl.
USPC ....................................... 379/93.01; 455/406
(58) Field of Classification Search
None
See application file for complete search history.

(56) References Cited

U.S. PATENT DOCUMENTS 5,963,618 A * 10/1999 Porter .......................... 704/270.1
5,987,524 A    11/1999 Yoshida et al.
(Continued)

FOREIGN PATENT DOCUMENTS

BY          1196 U      5/2003
CN    101132440 A      2/2008
(Continued)

OTHER PUBLICATIONS

Gonzalo Camarillo et al: "Session Control in the IMS"; In: "The 3G IP Multimedia Subsystem (IMS): Merging the Internet and the Cellular Worlds", Jul. 1, 2005, John Wiley & Sons, XP055075423, ISBN: 978-0-47-087156-0, pp. 91-178.

(Continued)

*Primary Examiner* — Maria El-Zoobi
(74) *Attorney, Agent, or Firm* — Oppedahl Patent Law Firm LLC (57) ABSTRACT

The disclosure discloses a method for a service access of a user in an Access Gateway Control Function (AGCF) entity, wherein a corresponding relationship between a logic number and a physical number of the user in the AGCF entity is stored in a Home User Server (HSS), the method includes that: in a registration process initiated by the user, the AGCF entity acquires the corresponding relationship between the physical number of the user and the logic number of the user from the HSS and stores it. The disclosure further discloses a system for a service access of a user in an AGCF entity, the system includes: a first storage unit, located in the HSS and configured to store a corresponding relationship between the logic number of the user and the physical number of the user in the AGCF entity; a registration unit, configured to register the user; a first acquisition unit, configured to acquire the corresponding relationship between the physical number of the user and the logic number of the user from the HSS in a registration process initiated by the user; and a second storage unit, located in the AGCF entity and configured to store the corresponding relationship between the logic number of the user and the physical number of the user. The disclosure realizes very low maintenance cost during a diversion and other operation.

10 Claims, 5 Drawing Sheets

(56) References Cited

U.S. PATENT DOCUMENTS

| | | | |
|---|---|---|---|
| 2003/0179750 A1 | 9/2003 | Hasty, Jr. et al. | |
| 2004/0179665 A1* | 9/2004 | Chen et al. | 379/114.05 |
| 2005/0278533 A1* | 12/2005 | Mayer | 713/170 |
| 2006/0198383 A1 | 9/2006 | Li et al. | |
| 2008/0049648 A1* | 2/2008 | Liu et al. | 370/310 |
| 2008/0295154 A1 | 11/2008 | Suh et al. | |
| 2010/0046499 A1 | 2/2010 | Hu et al. | |
| 2012/0238243 A1* | 9/2012 | Rao | 455/406 |

FOREIGN PATENT DOCUMENTS

| | | |
|---|---|---|
| CN | 101247318 A | 8/2008 |
| EP | 1909438 A1 | 4/2008 |
| KR | 20080102646 A | 11/2008 |
| RU | 2084950 C1 | 7/1997 |
| RU | 2004135075 A | 9/2005 |
| RU | 2283542 C2 | 9/2006 |
| RU | 2007114891 A | 10/2008 |
| WO | 2007009298 A1 | 1/2007 |

OTHER PUBLICATIONS

"Tispan NGN IMS-based PSTN/ISDN Emulation Call Control Protocols Stage 3"; Draft ETSI TS 183 043 V<0.1.6>, Feb. 7, 2006, pp. 1-64.

Supplementary European Search Report in European application No. 10814950.1, mailed on Aug. 27, 2013.

International Search Report in international application No. PCT/CN2010/075196, mailed on Oct. 28, 2010.

English Translation of the Written Opinion of the International Search Authority in international application No. PCT/CN2010/075196, mailed on Oct. 28, 2010.

\* cited by examiner

METHOD AND SYSTEM FOR SERVICE ACCESS OF USER IN ACCESS GATEWAY CONTROL FUNCTION ENTITY

TECHNICAL FIELD

The disclosure relates to the field of a technology for a service access of a user in an Access Gateway Control Function (AGCF) entity, and in particular to a method and system for a service access of a user in the AGCF entity in a Public Switched Telephone Network (PSTN)/Integrated Services Digital Network (ISDN) Emulation Subsystem (PES) network.

BACKGROUND

An IP Multimedia Core Network Subsystem (IMS) is an IP-based network architecture which is put forward by the 3rd Generation Partnership Project (3GPP) institute, and the IMS constructs an open and flexible service environment, supports multimedia applications and provides an abundant multimedia service for a user. The PES supports Telecommunications and Internet converged Services and Protocols for Advanced Networking (TISPAN), and is an IP-based network architecture put forward by accessing a traditional user terminal to the IMS.

In the PES, it is not advocated to directly connect an AGCF entity to a boss system; and a user in an AGCF entity is allocated in a boss system, which should not be directly distributed to the AGCF entity by the boss system through a relevant interface and is stored in the AGCF entity. At present, in a relevant specification put forward by the European Telecommunications Standards Institute (ETSI), it is required that an AGCF entity and a register server should be consistent in the configuration of a user, but how to realize it is not described.

It is required that a Public User Identifier (PUI), i.e., a PUI used in a calling, is stored in a network entity, such as an AGCF entity and the like. That is, the PUI configured for a user line in the AGCF entity should be consistent with that in network elements in the PES, such as an Application Server (AS), a Call Session Control Function (CSCF) entity, a Home User Server (HSS) and the like. This brings management and network burden to the mobility supporting of the user in the AGCF entity, for example, the AGCF entity needs be brought into the boss system for management, which undoubtedly increases processing burden of a network side; in addition, distribution of the AGCF entity is scattered and a location where the AGCF entity is located is remote, so that the AGCF entity cannot be maintained as conveniently as the HSS, CSCF entity or AS after being brought into the boss system. For example, when a user in the AGCF entity diverts, the corresponding relationship between a logic number (a logic PUI) of the user and a physical number (a physical PUI) of the user needs to be re-configured in the HSS, CSCF entity or AS; since configuration information in the AGCF entity needs to be consistent with that in the HSS, CSCF entity or AS, corresponding configuration information in the AGCF entity must be upgraded; and in case of a large-scale diversion or frequent diversion, maintenance work will be very complicated.

SUMMARY

In view of the above-mentioned problem, the main purpose of the disclosure is to provide a method and system for a service access of a user in an AGCF entity, which are capable of realizing that the corresponding relationship between the logic number of the user and the physical number of the user is only stored in an HSS, and the AGCF entity acquires the corresponding relationship between the logic number of the user and the physical number of the user in the HSS by the registration of the user and stores it.

In order to achieve the above purpose, the technical solution of the disclosure is implemented as follows.

The present disclosure provides a method for a service access of a user in an Access Gateway Control Function (AGCF) entity, wherein a corresponding relationship between a logic number of the user and a physical number of the user in the AGCF entity is stored in a Home Subscriber Server (HSS), the method includes that:

in a registration process initiated by the user, the AGCF entity acquires the corresponding relationship between the physical number of the user and the logic number of the user from the HSS and stores it.

Preferably, the method further includes that:

in a calling process of the user, the AGCF entity acquires the logic number of the user by using the stored corresponding relationship between the physical number and the logic number and implements a service access of the user.

Preferably, the registration process may include that:

after receiving the first registration request of the AGCF entity the HSS determines a Serving Call Session Control Function (S-CSCF) entity for the user when determining that the physical number of the user has a corresponding logic number, and notifies the AGCF entity of registration failure after the authentication of the user is passed;

after receiving the second registration request of the AGCF entity, the HSS notifies an Interrogating Call Session Control Function (I-CSCF) entity of the second registration request; and after receiving a service allocation request of the S-CSCF entity and determining a subscription service of the user, the HSS notifies the S-CSCF entity of the subscription service, and notifies the AGCF entity of registration success and of the logic number of the user.

Preferably, the registration process may include that:

after receiving the first registration request of the AGCF entity the HSS determines a S-CSCF entity for the user when determining that the physical number of the user has a corresponding logic number, and after receiving a service allocation request of the S-CSCF entity and determining a subscription service of the user, the HSS notifies the S-CSCF entity of the subscription service, and notifies the AGCF entity of registration success and of the logic number of the user.

Preferably, the registration process may further include that:

the AGCF entity, after receiving the registration request of the user, acquires physical number information of the user, and inserts the physical number information of the user in the first registration request which is forwarded to the HSS by the I-CSCF entity; and when the HSS determines that the physical number of the user does not have a corresponding logic number, the current registration flow is ended.

The present disclosure further provides a system for a service access of a user in an AGCF entity, the system includes a first storage unit, a registration unit, a first acquisition unit and a second storage unit, wherein the first storage unit is located in the HSS and configured to store a corresponding relationship between the logic number of the user and the physical number of the user in the AGCF entity;

the registration unit is configured to register the user;

the first acquisition unit is configured to acquire the corresponding relationship between the physical number of the user and the logic number of the user from the HSS in a registration process initiated by the user; and the second storage unit is located in the AGCF entity and configured to store the corresponding relationship between the logic number of the user and the physical number of the user.

Preferably, the system may further include a second acquisition unit and a service access unit, wherein the second acquisition unit is located in the AGCF entity and configured to acquire the logic number of the user by using the corresponding relationship between the physical number and the logic number stored in the second storage unit in a calling process of the user; and the service access unit is configured to implement a service access of the user according to the logic number.

Preferably, the registration unit may further include a first receiving unit, a first determining unit, an authenticating unit, a first notifying unit, a second receiving unit, a third receiving unit, a second determining unit and a second notifying unit, wherein the first receiving unit is configured to receive the first registration request of the AGCF entity;

the first determining unit is configured to determine an S-CSCF entity for the user when determining that the physical number of the user has a corresponding logic number;

the authenticating unit is configured to authenticate the user and triggering the first notifying unit after the authentication is passed;

the first notifying unit is configured to notify the AGCF entity of registration failure;

the second receiving unit is configured to receive the second registration request of the AGCF entity;

the third receiving unit is configured to receive a service allocation request of the S-CSCF entity;

the second determining unit is configured to determine subscription service of the user and triggering the second notifying unit; and the second notifying unit is configured to notify the S-CSCF entity of the subscription service of the user, and notify the AGCF entity of registration success and of the logic number of the user.

Preferably, the registration unit may include a first receiving unit, a first determining unit, a second receiving unit, a second determining unit and a notifying unit, wherein the first receiving unit is configured to receive the first registration request of the AGCF entity;

the first determining unit is configured to determine an S-CSCF entity for the user when determining that the physical number of the user has a corresponding logic number;

the second receiving unit is configured to receive a service allocation request of the S-CSCF entity;

the second determining unit is configured to determine subscription service of the user and triggering the notifying unit; and the notifying unit is configured to notify the S-CSCF entity of the subscription service of the user, and notify the AGCF entity of the registration success and of the logic number of the user.

Preferably, the registration unit may further include a fourth receiving unit, a third acquisition unit and a forwarding unit, wherein the fourth receiving unit is located in the AGCF entity and configured to receive a registration request of the user;

the third acquisition unit is located in the AGCF entity and configured to acquire physical number information of the user according to the registration request of the user;

the forwarding unit is located in the AGCF entity and configured to forward the first registration request to the HSS by the I-CSCF entity; wherein the first registration request includes the physical number information of the user; and when the first determining unit further determines that the physical number of the user does not have a corresponding logic number, the current registration flow is configured to be ended.

In the disclosure, the corresponding relationship between the logic number of the user and the physical number of the user in the AGCF entity is stored in the HSS; while the user in the AGCF entity performs a registration through the AGCF entity, after the registration is successful, the HSS determines the corresponding logic number information according to the physical number information included by the registered user and notifies the AGCF entity of it; and the corresponding AGCF entity stores the corresponding relationship between the physical number of the user and the logic number of the user; and when a service access request of the user is received, the service access can be implemented directly by using the included logic number of the user. Since the corresponding relationship between the logic number and the physical number of the user is stored in the HSS, during the diversion and other operation of the user, the corresponding relationship between the logic number and the physical number in the HSS is directly modified, while the AGCF entity of the user can implement the same configuration as that of the HSS when the user performs a registration, so that the diversion can be implemented without separately maintaining the AGCF entity and the maintenance cost is very low.

DETAILED DESCRIPTION

The basic idea of the disclosure is that: the corresponding relationship between the logic number of the user and the physical number of the user in the AGCF entity is stored in the HSS; while the user in the AGCF entity performs a registration through the AGCF entity, after the registration is successful, the HSS determines the corresponding logic number information according to the physical number information included by the registered user and notifies the AGCF entity of it; and the corresponding AGCF entity stores the corresponding relationship between the physical number of the user and the logic number of the user; and when a service access request from the user is received, the service access can be implemented directly by the included logic number of the user. Since the corresponding relationship between the logic number and the physical number of the user is stored in the HSS, during the diversion and other operation of the user, the corresponding relationship between the logic number and the physical number in the HSS is directly modified, while the AGCF entity of the user can implement the same configuration as that of the HSS when the user performs a registration, so that the diversion can be implemented without separately maintaining the AGCF entity and the maintenance cost is very low.

To make the purpose, technical solution and advantages of the disclosure more clear, the disclosure will be further described in detail with reference to embodiments and the drawings hereinafter.

A physical number (or physical PUI) in the disclosure is a number corresponding to a user line (such as an IP address and a port number). The physical number is allocated to the user line in the AGCF entity during networking, wherein the physical number can be permanently used by a user and is invisible to the user.

A logic number (or logic PUI) in the disclosure is a number allocated to a user during number allocation and is known to the user; and service information of the user is also bound with the logic number (or logic PUI). Under the management of the HSS, the physical number (or physical PUI) can realize to be bound with the logic number (or logic PUI), and the physical number and the logic number are not necessarily the same. However, along with the change of the number allocation, and the appearance of services of the user, such as a diversion without changing number, the bonding relationship will also be correspondingly changed. If a user line only has a physical number (or physical PUI) but no logic number (or logic PUI) in an HSS, it is indicated that the user line is still not allocated to any user. When receiving a registration request of the user line, the HSS directly returns a registration failure response.

In the disclosure, the corresponding relationship between the physical PUI and the logic PUI is stored in the HSS or other network element. An AGCF entity uses the physical PUI during the registration request, and uses the PUI returned by the registration response, i.e., the logic PUI, in a flow, such as calling, subscription and the like. How to implement the technical solution of the disclosure will be described in detail hereinafter.

Figure 1:
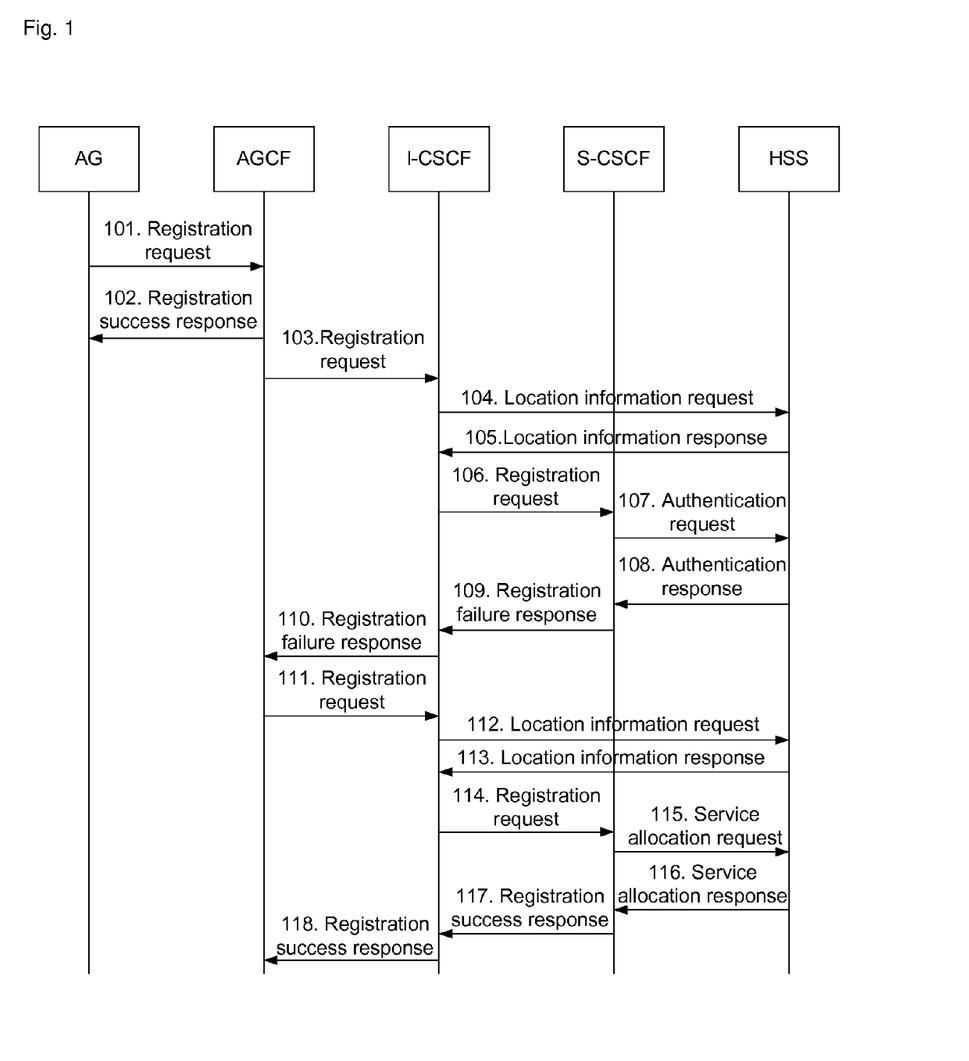
FIG. 1 is a flowchart illustrating a method for a service access of a user in an AGCF entity in a first embodiment of the disclosure.

FIG. 1 is a flowchart of a method for a service access of a user in an AGCF entity in the first embodiment of the disclosure; the corresponding relationship between the logic number and the physical number of the user in an AGCF entity is stored in an HSS, and as shown in FIG. 1, the method for the service access of the user in the AGCF entity in the embodiment includes the following steps.

Step S101: the AGCF entity receives a registration request message from a user terminal. Specifically, the user sends a registration request message to the AGCF entity by an Access Gateway (AG), and the AG transmits the registration request message of the user to the AGCF entity. The registration request message here can be a Service Change message in the H.248, standard and includes physical number information of the user terminal.

Step S102: the AGCF entity returns a registration success response message to the user terminal. The registration success response message here can be a Reply message in the H.248, standard.

Step S103: the AGCF entity sends a registration request message to the Interrogating Call Session Control Function (I-CSCF) entity for the user in the AGCF entity. The registration request message here can be a Register message in the 3GPP TS24.229. The PUI included in the message is the physical number of the user.

Step S104: after receiving the registration request message of the AGCF entity, the I-CSCF entity sends a location information request message to the HSS, wherein the location information request message is designed to enable the HSS determine the legality of the physical PUI of the user line and acquire the Serving Call Session Control Function (S-CSCF) entity used by the user in a calling. The specific implementation message can be a User Authorization Request (UAR) message in the 3GPP TS29.228/3GPP TS29.229. When the legality of the PUI is determined, besides completing work to be completed in the current 3GPP specification, the HSS also needs to determine whether the user has a corresponding logic number (or logic PUI), if not, a failure response should be returned, which means that the user line is still not allocated to any user and the physical number the user requests to register is an illegal user line, then, a failure response message is directly returned and the whole registration flow is ended. The HSS finds whether the physical number has a corresponding allocated logic number according to the physical number of the user in the location information request message sent by the I-CSCF entity, if yes, the HSS notifies the I-CSCF entity of that the physical number has a corresponding logic number by a location information request response message in step S105; otherwise, the HSS notifies the I-CSCF entity of that the physical number does not have a corresponding logic number also by the location information request response message in step S105; and the current flow is ended. It should be explained that, in the step, the HSS determines an S-CSCF entity used in a service access of the user for the user according to the logic number information corresponding to the physical number of the user, and notifies the I-CSCF entity of the determined S-CSCF entity information when determining that the physical number of the user has a corresponding logic number.

Step S105: the HSS feeds a location information response message, which is a location information request response message, back to the I-CSCF entity. The location information request response message here can be a User Authorization Answer (UAA) message in the 3GPP TS29.228/3GPP TS29.229. The location information response message includes the S-CSCF entity information; and the logic number information corresponding to the physical number of the user will not be included in the fed-back location information response message as the user is not authenticated during this registration.

Step S106: the I-CSCF entity sends a registration request message to the S-CSCF entity of the user. The registration request message can be the register message in the 3GPP TS24.229.

Step S107: after receiving the registration message of the I-CSCF entity, the S-CSCF entity sends an authentication request message to the HSS to send related information used in the authentication to the HSS, so that the HSS performs the authentication. The related information here includes identifier information of the hardware of the user terminal and the like. The authentication request message can be a Multimedia Authorization Request (MAR) message in the 3GPP TS29.228/3GPP TS29.229.

Step S108: the HSS feeds an authentication response message, which is an authentication request response message, back to the S-CSCF entity. The authentication request response message here can be a Multimedia Authorization Answer (MAA) message in the 3GPP TS29.228/3GPP TS29.229.

Step S109: the S-CSCF entity returns a registration failure response message to the I-CSCF entity. The registration failure response message here can be a 401 message and the like in the 3GPP TS24.229,, wherein the 401 message includes a random number used in the aforementioned authentication. When the user adopts other registration ways, either other information or other failure response message can be included in the 401 message.

Step S110: the I-CSCF entity returns the registration failure response message to the AGCF entity. The registration failure response message here can be the 401 message in the 3GPP TS24.229,, and the 401 message includes the random number used in the aforementioned authentication.

Step S111: after receiving the registration failure response message, the AGCF entity initiates a registration again and sends a registration request message to the I-CSCF entity. The registration request message here can be the Register message in the 3GPP TS24.229. The registration request message includes the physical number information of the user.

Step S112: the I-CSCF entity sends a location information request message to the HSS, wherein the location information request message is designed to enable the HSS determine the legality of the physical PUI of the user line and acquire the S-CSCF entity used by the user in a calling. The specific implementation message can be the UAR message in the 3GPP TS29.228/3GPP TS29.229. When the legality of the PUI is determined, besides completing the work to be completed in the current 3GPP specification, the HSS also needs to determine whether the user has the corresponding logic number (or logic PUI), if not, a failure response should be returned, which means that the user line is still not allocated to any user and the physical number the user requests to register is an illegal user line, then, a failure response message is directly returned and the whole registration flow is ended. The HSS finds whether the physical number has a corresponding allocated logic number according to the physical number of the user in the location information request message sent by the I-CSCF entity, if yes, the HSS notifies the I-CSCF entity of that the physical number has a corresponding logic number by a location information request response message in step S113; otherwise, the HSS notifies the I-CSCF entity of that the physical number does not have a corresponding logic number also by the location information request response message in step S113; and the current flow is ended. It should be explained that, in the step, the HSS determines an S-CSCF entity used in a service access of the user for the user according to the logic number information corresponding to the physical number of the user, and notifies the I-CSCF entity of the determined S-CSCF entity information when determining that the physical number of the user has a corresponding logic number. The HSS also needs to authenticate the message sent by the AGCF entity according to the random number previously determined for the AGCF entity, if the authentication is successful, the HSS notifies the I-CSCF entity of the successful authentication; otherwise, the current flow is ended.

Step S113: the HSS returns a location information response message, which is a location information request response message, to the I-CSCF entity. The location information response message here can be the UAA message in the 3GPP TS29.228/3GPP TS29.229. The location information response message includes the S-CSCF entity message used for the service access of the user.

Step S114: after receiving the location information response message, the I-CSCF entity sends a registration request message to the S-CSCF entity. The registration request message here can be the Register message in the 3GPP TS24.229.

Step S115: After receiving the registration request message, the S-CSCF entity sends a service allocation request message to the HSS to mainly acquire the service information of the user. The service allocation request message here can be a Server Assignment Request (SAR) message in the 3GPP TS29.228/3GPP TS29.229. The HSS, after receiving the service allocation request message, determines subscription service information of the user, and notifies the S-CSCF entity of the subscription service information of the user by a service allocation request response message in step S116 and notifies of the logic number information corresponding to the physical number of the user; then, the S-CSCF entity notifies the I-CSCF entity of the logic number of the user; the specific process will be described in detail hereinafter.

Step S116: the HSS performs a response on the service allocation to the S-CSCF entity, i.e., sending a service allocation request response message to the S-CSCF entity, and returns service information, and includes the logic number of the user in a service allocation request response message. The service allocation request response message here can be a Server Assignment Answer (SAA) message in the 3GPP TS29.228/3GPP TS29.229. The S-CSCF entity stores the service information returned by the HSS.

Step S117: the S-CSCF entity returns a registration success response message to the I-CSCF entity. The registration success response message here can be a 200 OK message in the 3GPP TS24.229, and includes the logic number information of the user.

Step S118: the I-CSCF entity returns a registration success response message to the AGCF entity. The registration success response message here can be the 200, OK message in the 3GPP TS24.229, and includes the logic number information of the user. The AGCF entity stores the logic PUI of the user returned in the registration success response message, i.e., storing the corresponding relationship between the logic PUI of the user and the physical number of the user, and serves the logic number of the user as the number for initiating a calling.

In the disclosure, flexibly bonding the physical number (or physical PUI) with the logic number (or logic PUI) on the HSS is realized, so that the requirements in the prior art on the PUIs which must be consistent at any time in the AGCF entity and the HSS and on how to keep them consistent are not existed any more. Moreover, the user in the AGCF entity can conveniently implement such services as diversion without changing number and the like. In the above registration process, the corresponding relationship between the logic number of the user and the physical number of the user can also be simultaneously stored in the S-CSCF entity and the I-CSCF entity. The allocation of the service information of the user can also be more flexible in the registration process, for example, the service information may not be stored in a network element, such as the CSCF entity and the like. In the calling process, the acquisition of the service information of the user can also be more flexible, for example, the service information of the user can be acquired from the HSS or other network element in the calling process.

After the registration is implemented, the user in the AGCF entity, whatever being a callee or calling, can implement a normal calling in the calling process by using the corresponding relationship between the logic number acquired in the registration and the physical number (corresponding terminal entity and port) recorded in the AGCF entity.

Figure 2:
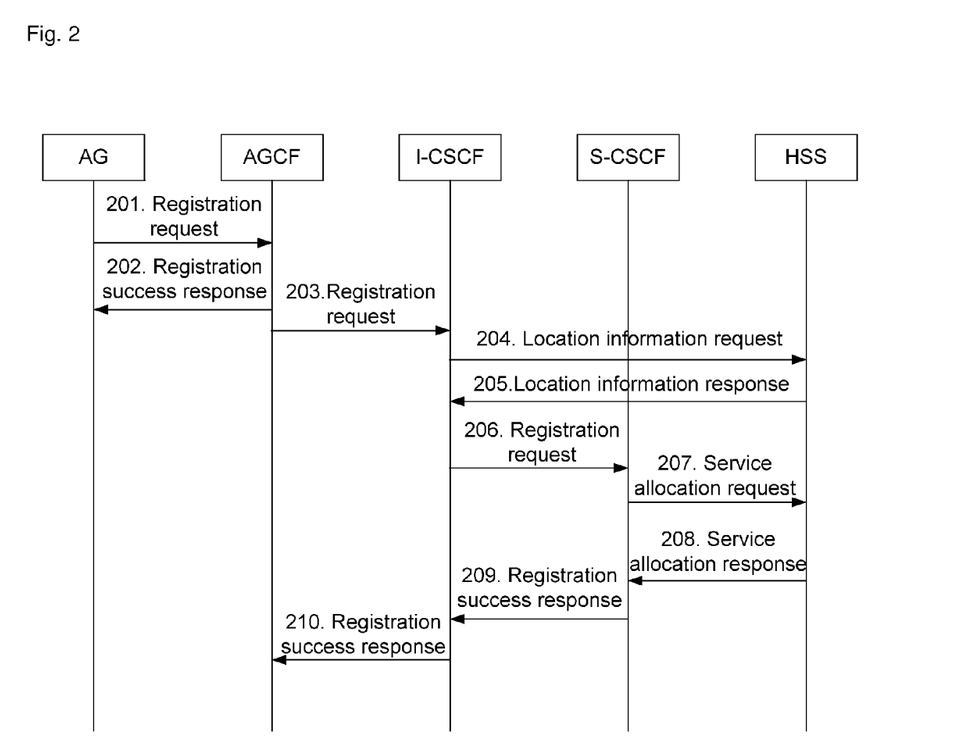
FIG. 2 is a flowchart illustrating a method for a service access of a user in an AGCF entity in a second embodiment of the disclosure.

FIG. 2 is a flowchart of a method for a service access of a user in an AGCF entity in the second embodiment of the disclosure; the corresponding relationship between the logic number and physical number of the user in an AGCF entity is stored in an HSS, and as shown in FIG. 2, the method for the service access of the user in the AGCF entity in the embodiment includes the following steps.

The flow from step S201 to step S206 is completely the same as that from step S101 to step S106.

The flow from step S207 to step S210 is completely the same as that from step S115 to step S118. The difference between the registration flow of the user in FIG. 2 and that in FIG. 1 lies in that, there is no challenging situation in the registration process of the user in FIG. 2, that is, the user does not need to be authenticated by the HSS and the whole registration flow can be completed by the first registration. Such situation is used for a specific user which does not need to be authenticated, such as a user having a higher priority.

Figure 3:
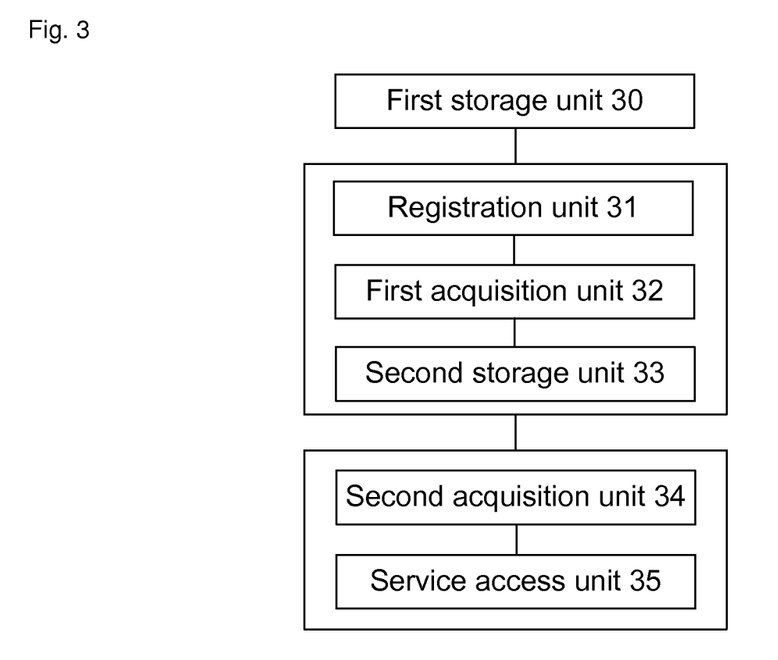
FIG. 3 is a schematic diagram illustrating a structure of a system for a service access of a user in an AGCF entity of the disclosure.

FIG. 3 is a schematic diagram showing a structure of a system for a service access of a user in an AGCF entity of the disclosure, and as shown in FIG. 3, the system for the service access of a user in an AGCF entity of the disclosure includes a first storage unit 30, a registration unit 31, a first acquisition unit 32 and a second storage unit 33, wherein the first storage unit 30 is located in the HSS and configured to store a corresponding relationship between a logic number of the user and a physical number of the user in the AGCF entity; the registration unit 31 is configured to register the user; the first acquisition unit 32 is configured to acquire the corresponding relationship between the physical number of the user and the logic number of the user from the HSS in the registration process initiated by the user; and the second storage unit 33 is located in the AGCF entity and configured to store the corresponding relationship between the logic number of the user and the physical number of the user.

As shown in FIG. 3, the system for a service access of a user in an AGCF entity of the disclosure further includes a second acquisition unit 34 and a service access unit 35, wherein the second acquisition unit 34 is located in the AGCF entity and configured to acquire the logic number of the user by the corresponding relationship between the physical number and the logic number stored in the second storage unit 33 in a calling process of the user; and the service access unit 35 is configured to implement a service access of the user according to the logic number.

Figure 4:
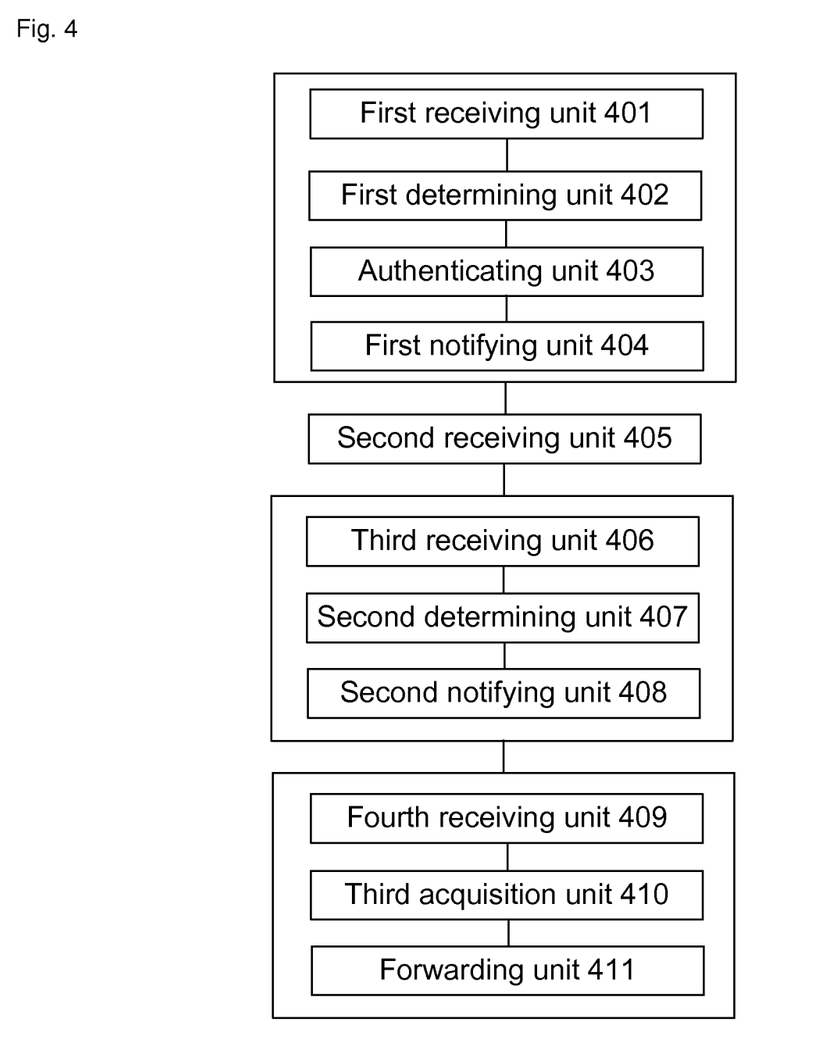
FIG. 4 is a schematic diagram illustrating a structure of a registration unit of the disclosure.

FIG. 4 is a schematic diagram showing a structure of a registration unit of the disclosure, and as shown in FIG. 4, the registration unit 31 of the disclosure further includes a first receiving unit 401, a first determining unit 402, an authenticating unit 403, a first notifying unit 404, a second receiving unit 405, a third receiving unit 406, a second determining unit 407 and a second notifying unit 408, wherein the first receiving unit 401 is configured to receive the first registration request of the AGCF entity; the first determining unit 402 is configured to determine whether the physical number of the user has a corresponding logic number, and determine an S-CSCF entity for the user if the physical number of the user has the corresponding logic number; the authenticating unit 403 is configured to authenticate the user and triggering the first notifying unit 404 if the authentication is passed; the first notifying unit 404 is configured to notify the AGCF entity of the registration failure; the second receiving unit 405 is configured to receive the second registration request of the AGCF entity; the third receiving unit 406 is configured to receive a service allocation request of the S-CSCF entity; the second determining unit 407 is configured to determine the subscription service of the user and triggering the second notifying unit 408; and the second notifying unit 408 is configured to notify the S-CSCF entity of the subscription service of the user, and notify the AGCF entity of the registration success and of the logic number of the user.

Figure 5:
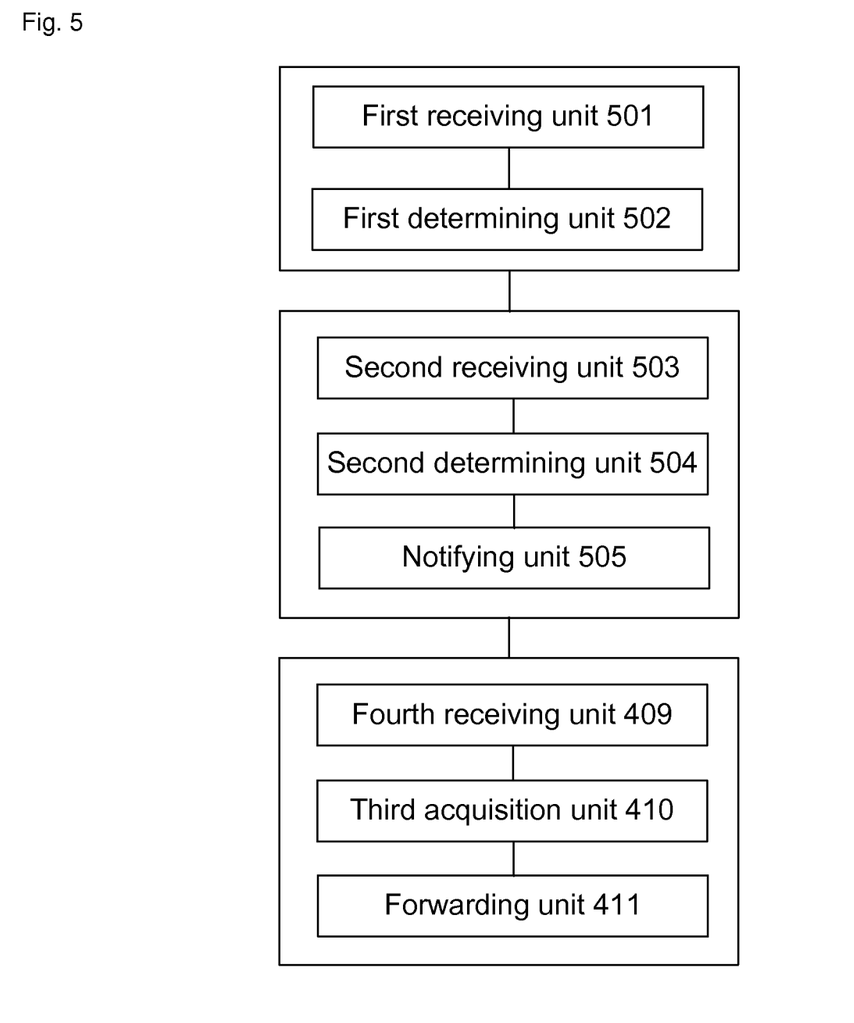
FIG. 5 is a schematic diagram illustrating another structure of a registration unit of the disclosure.

FIG. 5 is a schematic diagram showing another structure of a registration unit of the disclosure, and as shown in FIG. 5, the registration unit 31 of the embodiment further includes a first receiving unit 501, a first determining unit 502, a second receiving unit 503, a second determining unit 504 and a notifying unit 505, wherein the first receiving unit 501 is configured to receive the first registration request of the AGCF entity; the first determining unit 502 is configured to determine whether the physical number of the user has a corresponding logic number, and determine an S-CSCF entity for the user if the physical number of the user has the corresponding logic number; the second receiving unit 503 is configured to receive a service allocation request of the S-CSCF entity; the second determining unit 504 is configured to determine subscription service of the user and triggering the notifying unit 505; and the notifying unit 505 is configured to notify the S-CSCF entity of the subscription service of the user, and notify the AGCF entity of the registration success and of the logic number of the user.

As shown in FIGS. 4 and 5, the registration unit 31 of the disclosure further includes a fourth receiving unit 409, a third acquisition unit 410 and a forwarding unit 411, wherein the fourth receiving unit 409 is located in the AGCF entity and configured to receive a registration request of the user; the third acquisition unit 410 is located in the AGCF entity and configured to acquire physical number information of the user according to the registration request of the user; the forwarding unit 411 is located in the AGCF entity and configured to forward the first registration request to the HSS by the I-CSCF entity, wherein the first registration request includes the physical number information of the user; and when the first determining unit 402 or the first determining unit 502 further determines that the physical number of the user does not have a corresponding logic number, the current registration process is ended.

It should be understood by those skilled in the art that, the system for the service access of the user in the AGCF entity shown in FIG. 3 is designed for the implementation of the method for the service access of the user in the AGCF entity; the functions of all processing units in FIG. 3, FIG. 4 and FIG. 5 can be understood with reference to the description of the method shown in FIG. 1 and FIG. 2, and can be implemented either by programs running on a processor or by a specific logic circuit.

The above are only preferred embodiments of the disclosure, and the scope of protection of the disclosure is not limited herein.

The invention claimed is:

1. A method for a service access of a user in an Access Gateway Control Function, AGCF, entity, wherein a corresponding relationship between a logic number of the user and a physical number of the user in the AGCF entity is stored in a Home User Server, HSS, the method comprising:

acquiring by the AGCF entity, in a registration process initiated by the user, the corresponding relationship between the physical number of the user and the logic number of the user from the HSS and storing it by the AGCF; and acquiring by the AGCF entity, in a calling process of the user, the logic number of the user by using the stored corresponding relationship between the physical number and the logic number and implementing a service access for the user by the AGCF entity, wherein the physical number of the user is a number corresponding to the user line, which is allocated to the user line in the AGCF entity during networking, and which can be permanently used by the user and is invisible to the user;

the logic number of the user is a number allocated to the user during number allocation and is known to the user.

2. The method according to claim 1, wherein the registration process comprises:

after receiving a first registration request of the AGCF entity, determining a Serving Call Session Control Function, S-CSCF, entity for the user by the HSS when determining that the physical number of the user has a corresponding logic number, and notifying the AGCF entity of registration failure after authentication of the user is passed;

after receiving a second registration request of the AGCF entity, notifying an Interrogating Call Session Control Function, I-CSCF, entity of the second registration request by the HSS; and after receiving a service allocation request of the S-CSCF entity, determining a subscription service of the user and then notifying the S-CSCF entity of the subscription service by the HSS, and notifying the AGCF entity of registration success and of the logic number of the user.

3. The method according to claim 1, wherein the registration process comprises:

after receiving a first registration request of the AGCF entity, determining a S-CSCF entity for the user by the HSS when determining that the physical number of the user has a corresponding logic number; and after receiving a service allocation request of the S-CSCF entity, determining a subscription service of the user and then notifying the S-CSCF entity of the subscription service by the HSS, and notifying the AGCF entity of registration success and of the logic number of the user.

4. The method according to claim 2, wherein the registration process further comprises:

acquiring physical number information of the user by the AGCF entity, after receiving the registration request of the user, and inserting the physical number information of the user in the first registration request which is forwarded to the HSS by the I-CSCF entity; and when the HSS determines that the physical number of the user does not have a corresponding logic number, ending a current registration flow.

5. A system for a service access of a user in an Access Gateway Control Function, AGCF, entity, comprising a first storage unit, a registration unit, a first acquisition unit, a second storage unit, a second acquisition unit and a service access unit, wherein the first storage unit is located in a Home User Server, HSS, and configured to store a corresponding relationship between a logic number of the user and a physical number of the user in the AGCF entity;

the registration unit is configured to register the user;

the first acquisition unit is configured to acquire the corresponding relationship between the physical number of the user and the logic number of the user from the HSS in a registration process initiated by the user;

the second storage unit is located in the AGCF entity and configured to store the corresponding relationship between the logic number of the user and the physical number of the user;

the second acquisition unit is located in the AGCF entity and configured to acquire the logic number of the user by using the corresponding relationship between the physical number and the logic number stored in the second storage unit in a calling process of the user; and the service access unit is configured to implement a service access of the user according to the logic number, wherein the physical number of the user is a number corresponding to the user line, which is allocated to the user line in the AGCF entity during networking, and which can be permanently used by the user and is invisible to the user;

the logic number of the user is a number allocated to the user during number allocation and is known to the user.

6. The system according to claim 5, wherein the registration unit further comprises a first receiving unit, a first determining unit, an authenticating unit, a first notifying unit, a second receiving unit, a third receiving unit, a second determining unit and a second notifying unit, wherein the first receiving unit is configured to receive the first registration request of the AGCF entity;

the first determining unit is configured to determine a Serving Call Session Control Function, S-CSCF, entity for the user when determining that the physical number of the user has a corresponding logic number;

the authenticating unit is configured to authenticate the user and triggering the first notifying unit after the authentication is passed;

the first notifying unit is configured to notify the AGCF entity of the registration failure;

the second receiving unit is configured to receive the second registration request of the AGCF entity;

the third receiving unit is configured to receive a service allocation request of the S-CSCF entity;

the second determining unit is configured to determine the subscription service of the user and triggering the second notifying unit; and the second notifying unit is configured to notify the S-CSCF entity of the subscription service of the user, and notify the AGCF entity of the registration success and of the logic number of the user.

7. The system according to claim 5, wherein the registration unit comprises a first receiving unit, a first determining unit, a second receiving unit, a second determining unit and a notifying unit, wherein the first receiving unit is configured to receive the first registration request of the AGCF entity;

the first determining unit is configured to determine an S-CSCF entity for the user when determining that the physical number of the user has a corresponding logic number;

the second receiving unit is configured to receive a service allocation request of the S-CSCF entity;

the second determining unit is configured to determine subscription service of the user and triggering the notifying unit; and the notifying unit is configured to notify the S-CSCF entity of the subscription service of the user, and notify the AGCF entity of the registration success and of the logic number of the user.

8. The system according to claim 6, wherein the registration unit further comprises a fourth receiving unit, a third acquisition unit and a forwarding unit, wherein the fourth receiving unit is located in the AGCF entity and configured to receive a registration request of the user;

the third acquisition unit is located in the AGCF entity and configured to acquire physical number information of the user according to the registration request of the user;

the forwarding unit is located in the AGCF entity and configured to forward the first registration request to the HSS by an Interrogating Call Session Control Function, I-CSCF, entity, wherein the first registration request includes the physical number information of the user; and when the first determining unit further determines that the physical number of the user does not have a corresponding logic number, the current registration flow is configured to be ended.

9. The method according to claim 3, wherein the registration process further comprises:

acquiring physical number information of the user by the AGCF entity, after receiving the registration request of the user, and inserting the physical number information of the user in the first registration request which is forwarded to the HSS by the I-CSCF entity; and when the HSS determines that the physical number of the user does not have a corresponding logic number, ending a current registration flow.

10. The system according to claim 7, wherein the registration unit further comprises a fourth receiving unit, a third acquisition unit and a forwarding unit, wherein the fourth receiving unit is located in the AGCF entity and configured to receive a registration request of the user;

the third acquisition unit is located in the AGCF entity and configured to acquire physical number information of the user according to the registration request of the user;

the forwarding unit is located in the AGCF entity and configured to forward the first registration request to the HSS by an Interrogating Call Session Control Function, I-CSCF, entity, wherein the first registration request includes the physical number information of the user; and when the first determining unit further determines that the physical number of the user does not have a corresponding logic number, the current registration flow is configured to be ended.

* * * * *